Figure 1:
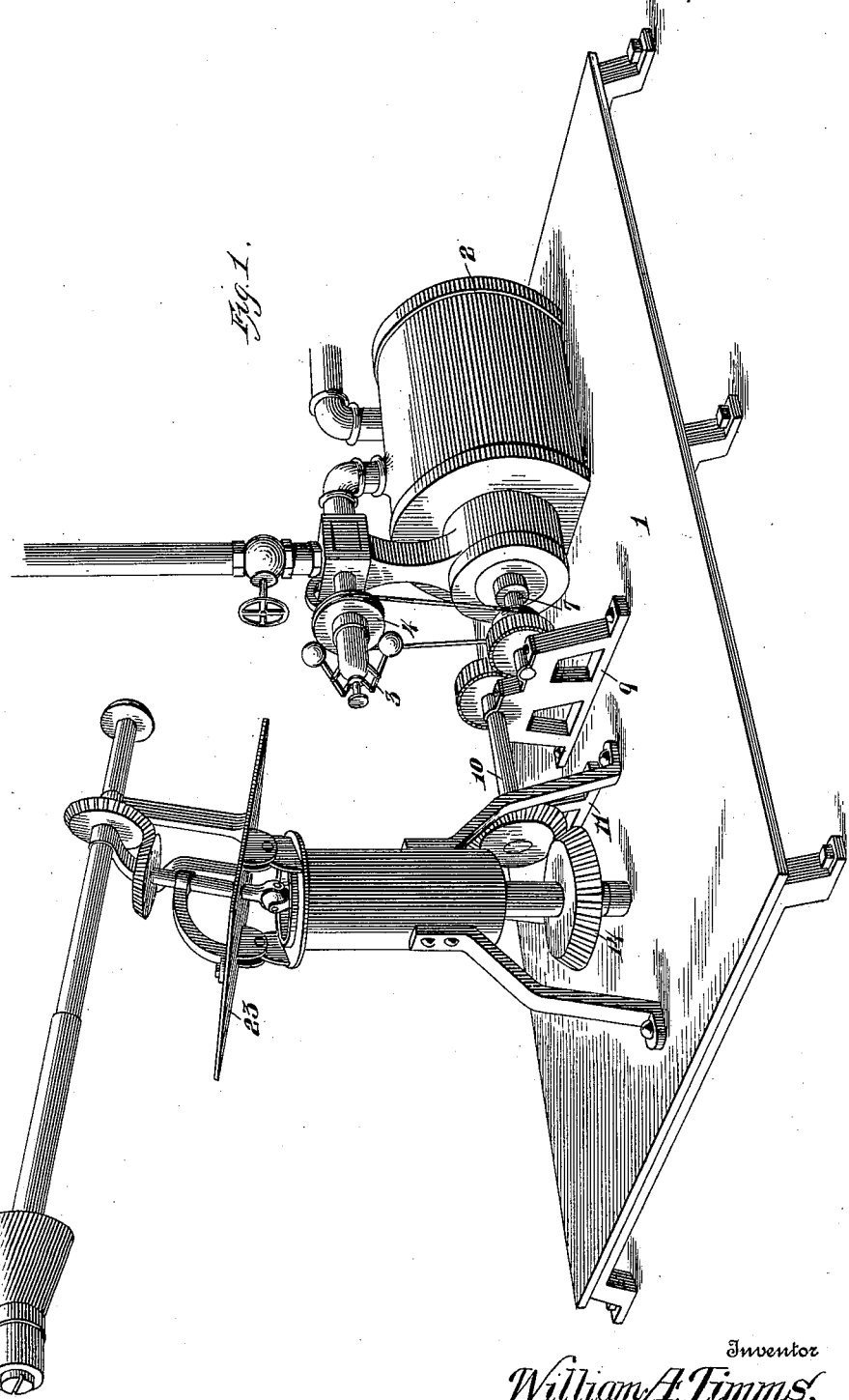

(No Model.) 2 Sheets—Sheet 1.

W. A. TIMMS.
BOLT TAPPING AND DRILLING MACHINE.

No. 594,044. Patented Nov. 23, 1897.

Witnesses
T. W. Riley,
Chas. P. Brock

Inventor
William A. Timms,
by O'Meara & Co.
Attorneys (No Model.) 2 Sheets—Sheet 2.
W. A. TIMMS.
BOLT TAPPING AND DRILLING MACHINE.
No. 594,044. Patented Nov. 23, 1897.
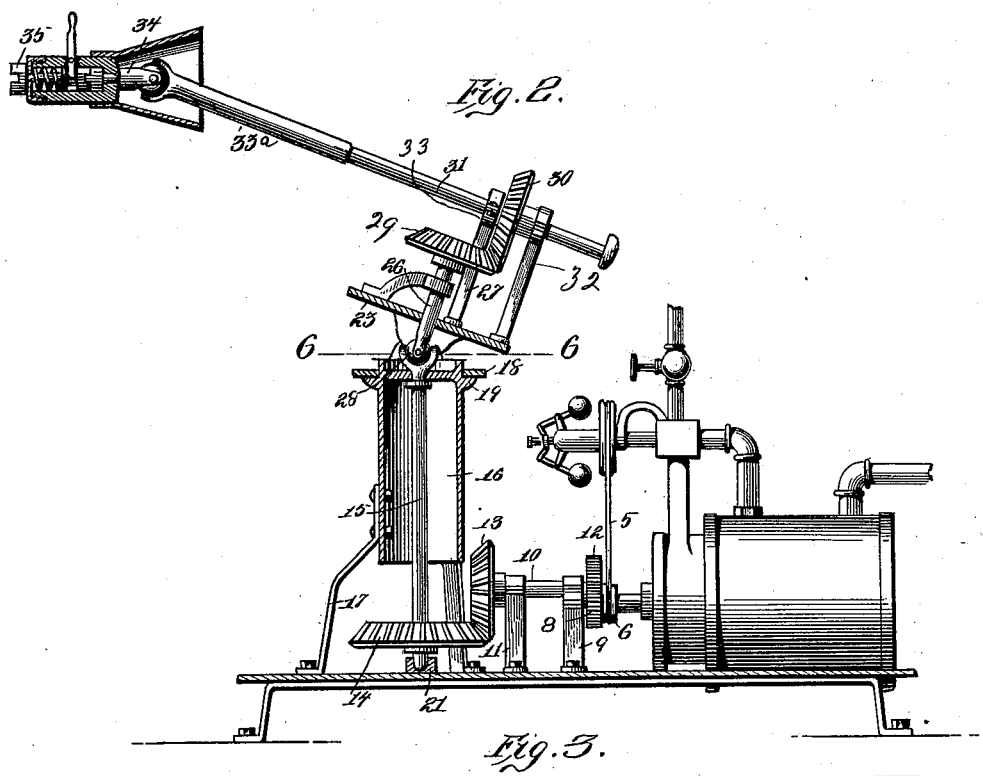
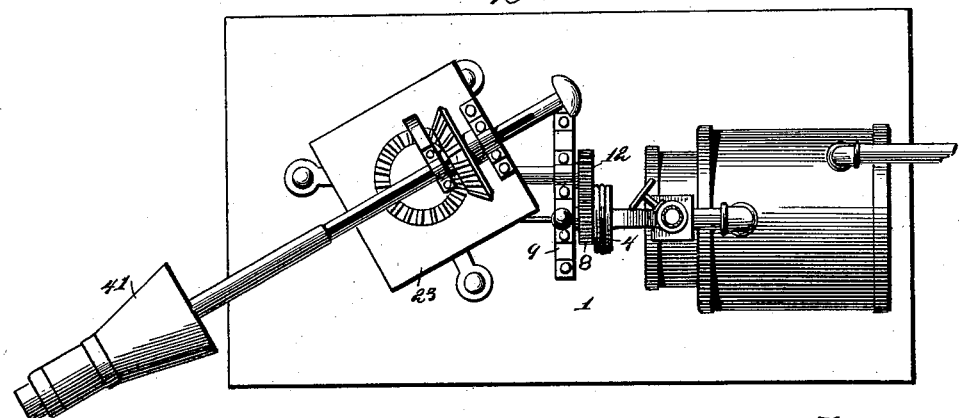
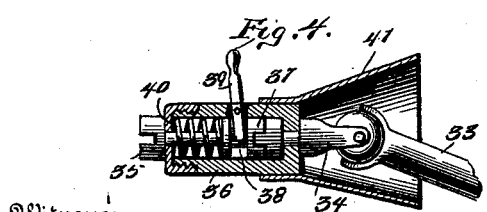
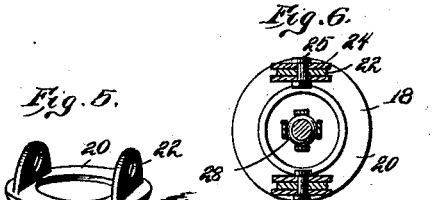
Witnesses
Inventor
W. A. Timms,

UNITED STATES PATENT OFFICE.

WILLIAM A. TIMMS, OF MOUNT VERNON, OHIO, ASSIGNOR OF ONE-HALF TO WILLIAM M. JOHNSON, OF NEWARK, OHIO.

BOLT TAPPING AND DRILLING MACHINE.

SPECIFICATION forming part of Letters Patent No. 594,044, dated November 23, 1897.

Application filed February 23, 1897. Serial No. 624,622. (No model.)

*To all whom it may concern:*

Be it known that I, WILLIAM A. TIMMS, residing at Mount Vernon, in the county of Knox and State of Ohio, have invented a new and useful Bolt Tapping and Drilling Machine, of which the following is a specification.

My invention relates to a bolt tapping and drilling machine adapted more particularly for shop use; and the object of my invention is to produce a machine that can be used for either drilling and tapping bolts and for boring and drilling purposes in general.

A further object of my device is to so construct the machine that it can be used in different positions, as will be hereinafter described.

My invention, broadly stated, consists of a suitable engine for driving the drill or tap and of intermediate gears which is supported by means which can be turned and tilted and connected at certain points by universal joints, which enables the drill to be used in any desired position.

My invention also consists in certain details of construction that will be hereinafter more fully described, and pointed out in the claims.

In order that my invention may be fully understood, I will proceed to describe the same with reference to the accompanying drawings, in which—

Figure 1 is a perspective view of my drilling and tapping machine. Fig. 2 is a side view, partly in section. Fig. 3 is a plan view. Fig. 4 is a detail sectional view of the drill or tap socket and catch. Fig. 5 is a detail perspective view of the turn-table and support. Fig. 6 is a detail sectional view taken on the line 6 6 of Fig. 2.

In the said drawings, 1 represents a suitable support; 2, a rotary engine or other motor mounted thereon; 3, the governor, and 4 a pulley carried on the governor-shaft. The pulley 4 is connected by means of a belt 5 with a pulley 6 on the shaft 7, carrying the master gear-wheel 8. The shaft 7, as will be seen, is journaled at one end in the support 9 and at its other end in a suitable box carried by the rotary engine.

10 represents a shaft journaled at one end in the support 9 and at its other end in a support 11, and fixed on this shaft at one end is a gear-wheel 12 in engagement with the master-gear 8 and at its other is the bevel-gear 13, which is in engagement with the bevel-gear 14, carried by the vertical shaft 15.

16 represents a suitable cylinder supported by means of the legs 17 on the support 1. The upper end 18 of this cylinder is provided with a suitable opening, through which the shaft 15 passes, and is formed with a flange 19, in which the turn-table 20 rests, hereinafter referred to. The lower end of the shaft 15 has a bearing in the step-block 21. The turn-table 20, which rests on the head 18, is provided with the flanges 22, to which is hinged the tilting plate 23 through the medium of the flanges 24 and pins 25, and mounted on the plate 23 is the mechanism for operating the drill or tap. This mechanism consists of the shaft 26, supported at one end by the support 27, and it is connected at its other end with the shaft 15 by means of the universal joint 28, which is necessary in order that the table may be tilted and turned.

29 represents a bevel-gear carried by the shaft 26, which meshes with the gear-wheel 30, carried by the shaft 31, journaled in the supports 32 and 33. The gear-wheel 30 is held on the shaft 31 through the medium of a feather which extends along the shaft. The advantage of this is to enable the shaft to be moved in either direction on its bearings by means of the handle 32.

33ª represents a rod or handle welded to the shaft 31, and it is connected with the short shaft 34 by means of a universal joint. One end of this shaft is formed with a clutch-face 35 and fits within a casing 36, and it has in engagement with it a clutch 37, which is carried by the socket-piece 38, in which the drill or tap fits.

39 represents a lever for operating the clutch, and 40 represents a spring for holding the clutch-faces in engagement.

41 represents a hood or shield carried by the casing for protecting the universal joint.

The advantages of my construction will be readily seen from the drawings and the above description. By the use of the universal-joint connections at the points shown I am enabled to drill and tap much more quickly and easily, for they enable the drill or tap to be brought to any desired position. This change in position of the drill or tap is also permitted by reason of the turn-table and tilting plate and the sliding arrangement of the shaft 31 in its bearings.

Having thus described my invention, what I claim as new, and desire to secure by Letters Patent, is—

1. The combination in a bolt tapping and drilling machine of the engine, the drill or tap adapted to be driven thereby, a suitable support, a turn-table carried on said support, and a table or plate hinged to said turn-table and carrying the drill or tap, and suitable gearing between said engine and drill or tap, substantially as shown and described.

2. In a bolt drilling and tapping machine, the combination of the engine, the drill or tap adapted to be driven thereby, a suitable support and a suitable plate carrying the drill or tap mounted to turn on said support, suitable gearing mounted on said plate for operating the drill or tap, suitable gearing carried by said support and operated by the engine, and a universal-joint connection between the gearing on the plate or table and the gearing carried by the support, substantially as shown and described.

3. In a bolt drilling and tapping machine, the combination of the engine or motor, a drill or tap adapted to be operated thereby, a suitable support and a turn-table mounted on said support, a table or plate hinged to said turn-table and carrying gearing for operating the drill or tap, a universal-joint connection placed between said gearing and drill or tap, suitable gearing for operating the gearing on said plate and having a universal-joint connection between the two, substantially as shown and described.

4. In a bolt drilling and tapping machine, the combination of the engine or motor and the drill or tap, a shaft for operating the said drill or tap having a universal joint therewith, and a support for said shaft in which said shaft slides lengthwise, suitable means in connection with said support for tilting and turning it and suitable means located between the engine and shaft for operating the shaft and a universal-joint connection between said means and the shaft substantially as shown and described.

WILLIAM A. TIMMS.

Witnesses:
O. G. DANIELS,
DANIEL F. KNERR.